(12) United States Patent
Sabharwal et al.

(10) Patent No.: US 11,501,233 B2
(45) Date of Patent: Nov. 15, 2022

(54) SYSTEM AND METHOD TO PERFORM CONTROL TESTING TO MITIGATE RISKS IN AN ORGANIZATION

(71) Applicant: HCL Technologies Limited, Noida (IN)

(72) Inventors: Navin Sabharwal, Noida (IN); Amit Agrawal, Noida (IN)

(73) Assignee: HCL Technologies Limited, Noida (IN)

( * ) Notice: Subject to any disclaimer, the term of this patent is extended or adjusted under 35 U.S.C. 154(b) by 70 days.

(21) Appl. No.: 16/417,656

(22) Filed: May 21, 2019

(65) Prior Publication Data
US 2020/0372423 A1    Nov. 26, 2020

(51) Int. Cl.
| | | |
|---|---|---|
| G06Q 10/00 | (2012.01) | |
| G06Q 10/06 | (2012.01) | |
| G06Q 10/10 | (2012.01) | |
| G06N 3/08 | (2006.01) | |
| G06F 16/906 | (2019.01) | |
| G06N 20/00 | (2019.01) | |
| G06F 40/30 | (2020.01) | |
| G06F 40/56 | (2020.01) | |

(52) U.S. Cl.
CPC ....... *G06Q 10/0635* (2013.01); *G06F 16/906* (2019.01); *G06F 40/30* (2020.01); *G06F 40/56* (2020.01); *G06N 3/08* (2013.01); *G06N 20/00* (2019.01); *G06Q 10/1095* (2013.01)

(58) Field of Classification Search
None
See application file for complete search history.

(56) References Cited

U.S. PATENT DOCUMENTS

| | | | | |
|---|---|---|---|---|
| 5,200,893 A | * | 4/1993 | Ozawa | G06F 40/211 715/235 |
| 6,018,730 A | * | 1/2000 | Nichols | G06F 9/453 706/45 |
| 6,581,057 B1 | * | 6/2003 | Witbrock | G06F 16/345 |
| 6,675,159 B1 | * | 1/2004 | Lin | G06F 40/253 |

(Continued)

OTHER PUBLICATIONS

Pinar Donmez and Jaime G. Carbonell (From Active to Proactive Learning Methods, Advances in Machine Learning I, SCI 262, pp. 97-120, Springer-Verlag Berlin Heidelberg 2010). (Year: 2010).*

(Continued)

*Primary Examiner* — Hafiz A Kassim
(74) *Attorney, Agent, or Firm* — Kendal Sheets (57) ABSTRACT

The present disclosure relates to system(s) and method(s) to perform control testing to mitigate risks in an organization. The system may extract sentences from control documents, and may classify the sentences into one of questions and non-questions, based on at least one of active learning and pro-active learning. Interpretations of the questions may thereafter be generated. Relevant documents related to each of the interpretations of the questions may be identified and extracted, from repositories. Artificial Intelligence (AI) may be used to identify the relevant documents. A cognitive master may be implemented to organize meetings between control testers and process owners for discussing over effectiveness of design and implementation test of test plans to mitigate the risks.

12 Claims, 8 Drawing Sheets

(56) References Cited

U.S. PATENT DOCUMENTS

| | | | | |
|---|---|---|---|---|
| 6,944,596 | B1* | 9/2005 | Gray | G06Q 10/1053 434/107 |
| 8,666,730 | B2 | 3/2014 | Todhunter et al. | |
| 9,672,251 | B1* | 6/2017 | Whang | G06F 16/24575 |
| 9,996,604 | B2* | 6/2018 | McCloskey | G06F 16/285 |
| 10,607,141 | B2* | 3/2020 | Jerram | G10L 13/00 |
| 10,798,152 | B2* | 10/2020 | Estes | G06F 40/131 |
| 10,803,399 | B1* | 10/2020 | Cohen | G06F 16/93 |
| 2002/0169771 | A1* | 11/2002 | Melmon | G06F 16/93 |
| 2005/0065865 | A1 | 3/2005 | Salomon et al. | |
| 2005/0193269 | A1* | 9/2005 | Haswell | G06F 11/3684 714/38.13 |
| 2006/0177808 | A1* | 8/2006 | Aosawa | G06Q 10/10 434/322 |
| 2006/0242154 | A1* | 10/2006 | Rawat | G06F 16/168 |
| 2007/0033221 | A1* | 2/2007 | Copperman | G06F 16/367 |
| 2009/0287678 | A1* | 11/2009 | Brown | G06F 16/334 |
| 2010/0235164 | A1* | 9/2010 | Todhunter | G06F 40/35 704/9 |
| 2011/0047114 | A1* | 2/2011 | Marvell | G06Q 10/06 706/46 |
| 2011/0125734 | A1* | 5/2011 | Duboue | G09B 7/00 707/723 |
| 2012/0190001 | A1 | 7/2012 | Knight et al. | |
| 2013/0226559 | A1* | 8/2013 | Lim | G06F 16/9535 704/9 |
| 2013/0246088 | A1* | 9/2013 | Huster | G06Q 10/0635 705/2 |
| 2014/0172417 | A1* | 6/2014 | Monk, II | G06F 40/30 704/9 |
| 2014/0229164 | A1* | 8/2014 | Martens | G06F 40/40 704/9 |
| 2015/0189086 | A1* | 7/2015 | Romano | H04M 3/42221 379/265.09 |
| 2015/0269932 | A1* | 9/2015 | Evanini | G06F 40/30 704/235 |
| 2016/0026634 | A1* | 1/2016 | Allen | G06N 5/02 707/740 |
| 2016/0063408 | A1* | 3/2016 | Rajaganesan | G06Q 10/0639 705/7.38 |
| 2016/0124963 | A1* | 5/2016 | Barker | G06F 40/284 707/728 |
| 2016/0140210 | A1* | 5/2016 | Pendyala | G06Q 50/18 707/737 |
| 2016/0232222 | A1* | 8/2016 | McCloskey | G06F 16/951 |
| 2016/0253596 | A1* | 9/2016 | Goth, III | G06F 16/24578 706/12 |
| 2016/0321283 | A1* | 11/2016 | Shen et al. | G06F 40/40 704/9 |
| 2017/0024310 | A1* | 1/2017 | Andrejko | G06F 11/3668 |
| 2017/0061285 | A1* | 3/2017 | Hikone | G06N 20/00 |
| 2017/0109355 | A1* | 4/2017 | Li | G06N 3/0445 |
| 2017/0161372 | A1* | 6/2017 | Fernández | G06F 40/268 |
| 2017/0344535 | A1* | 11/2017 | Shima | G09G 3/025 |
| 2018/0137433 | A1* | 5/2018 | Devarakonda | G16H 10/20 |
| 2018/0268298 | A1* | 9/2018 | Johansen | G06V 10/764 |
| 2018/0329879 | A1* | 11/2018 | Galitsky | G06F 40/44 |
| 2018/0341871 | A1* | 11/2018 | Maitra | G06N 3/0427 |
| 2018/0357220 | A1* | 12/2018 | Galitsky | G06F 40/216 |
| 2018/0357221 | A1* | 12/2018 | Galitsky | G06F 40/205 |
| 2019/0034807 | A1* | 1/2019 | Clark | G06N 20/00 |
| 2019/0138595 | A1* | 5/2019 | Galitsky | G06N 5/041 |
| 2019/0147882 | A1* | 5/2019 | Pankanti | H04M 3/568 704/231 |
| 2019/0179903 | A1* | 6/2019 | Terry | G06N 3/08 |
| 2019/0180195 | A1* | 6/2019 | Terry | G06F 16/34 |
| 2019/0213498 | A1* | 7/2019 | Adjaoute | G06N 20/00 |
| 2019/0272323 | A1* | 9/2019 | Galitsky | G06F 40/205 |
| 2019/0349440 | A1* | 11/2019 | York | G06F 40/123 |
| 2020/0042642 | A1* | 2/2020 | Bakis | G06F 16/243 |
| 2020/0159832 | A1* | 5/2020 | Cai | G06F 40/211 |
| 2020/0236120 | A1* | 7/2020 | Monteil | G06N 20/00 |
| 2020/0279017 | A1* | 9/2020 | Norton | G06F 16/36 |
| 2020/0302316 | A1* | 9/2020 | Mishra | G06N 5/043 |
| 2020/0311212 | A1* | 10/2020 | Moss | G06F 40/289 |

OTHER PUBLICATIONS

Shahla Ghobadi & Lars Mathiassen (Risks to Effective Knowledge Sharing in Agile Software Teams: A Model for Assessing and Mitigating Risks, Info Systems J (2017) 27, 699-731). (Year: 2017).*

Dong Wang and Thomas Fang Zheng (Transfer Learning for Speech and Language Processing, APSIPA 2015). (Year: 2015).*

Finale Doshi-Velez, Joelle Pineau, Nicholas Roy (Reinforcement learning with limited reinforcement: Using Bayes risk for active learning in POMDPs, Artificial Intelligence 187-188 (2012) 115-132). (Year: 2012).*

Kevin Waugh, Brian D. Ziebart, and J. Andrew Bagnel (Computational Rationalization: The Inverse Equilibrium Problem, Aug. 15, 2013) (Year: 2013).*

Khaled B. Shaban (Deep Learning Models for Sentiment Analysis in Arabic, Proceedings of the Second Workshop on Arabic Natural Language Processing, pp. 9-17, Beijing, China, Jul. 26-31, 2015. 2014 Association for Computational Linguistics) . . . (Year: 2014).*

Vamshi Ambati and Jaime Carbonell (Proactive Learning for Building Machine Translation Systems for Minority Languages, Jun. 2009, Association for Computational Linguistics). (Year: 2009).*

* cited by examiner

SYSTEM AND METHOD TO PERFORM CONTROL TESTING TO MITIGATE RISKS IN AN ORGANIZATION

CROSS-REFERENCE TO RELATED APPLICATIONS AND PRIORITY

The present application does not claim priority from any patent application.

TECHNICAL FIELD

The present disclosure in general relates to the field of control testing. More particularly, the present invention relates to a system and method for automating the process of control testing to mitigate risks in an organization.

BACKGROUND

Control testing is performed by control testers to assess design and operating procedures of controls to ensure mitigation of risk in an organization. This process involves answering questions along with context from control documents and validates them against documents that are stored in multiple document repositories.

A control testing process typically involves three steps of design test, process validation, and implementation test. In Control testing process, the design test ensures whether a control document has been designed properly or not and process document should exist corresponding to controls. The process validation tests whatever process has been designed effectively in order to mitigate risk or not. The implementation test ensures that a test plan should be effective across an organization.

As per existing approach, a control tester reads control document to find answers to questions for design test and implementation test. However, for process validation step control tester has to sit together and argue over same in order to ensure that control under test is effectively mitigating risk in an organization.

During control testing, a control tester has to ensure that all test plans are properly documented in a control document. These test plans should be properly executed to ensure mitigation of risk. A control document has to be filled with answers to questions asked as part of test plans. Current approach is completely manual which consumes lot of time in identification and extraction of answers or documents from multiple repositories as sometimes even a person is not aware of where the documents actually exist. Sometimes, a human control tester needs to visit all different types of repositories to identify a correct document that could answer questions present in a control document. This approach also lacks accuracy, and involves limited way of knowledge sharing amongst human control tester to speed up process.

Therefore, in view of the above mentioned shortcomings, there lies an immense need of a system that could automate at least most of the process of control testing to mitigate risks in an organization, and improve accuracy within the process.

SUMMARY

Before the present systems and methods to perform control testing to mitigate risks in an organization, are described, it is to be understood that this application is not limited to the particular systems, and methodologies described, as there can be multiple possible embodiments which are not expressly illustrated in the present disclosure. It is also to be understood that the terminology used in the description is for the purpose of describing the particular versions or embodiments only, and is not intended to limit the scope of the present application. This summary is provided to introduce concepts related to systems and methods to perform control testing to mitigate risks in an organization. This summary is not intended to identify essential features of the claimed subject matter nor is it intended for use in determining or limiting the scope of the claimed subject matter.

In one implementation, a system performing control testing to mitigate risks in an organization script is described. The system comprises a memory and a processor coupled to the memory, further the processor is configured to execute programmed instructions stored in the memory. In one embodiment, the processor may execute programmed instructions stored in the memory for extracting sentences from control documents, and classifying the sentences into one of questions and non-questions, based on at least one of active learning and pro-active learning. Further, the processor may execute programmed instructions stored in the memory for generating interpretations of the questions. The processor may also execute programmed instructions stored in the memory for identifying and extracting relevant documents related to each of the interpretations of the questions, from repositories. Artificial Intelligence (AI) may be used to identify the relevant documents. The processor may further execute programmed instructions stored in the memory for implementing a cognitive master to organize meetings between control testers for discussing over effectiveness of design and implementation test of test plans to mitigate the risks.

In another implementation, a method to perform control testing to mitigate risks in an organization is described. In one embodiment, the method may comprise extracting sentences from control documents, and classifying the sentences into one of questions and non-questions, based on at least one of active learning and pro-active learning. The method may further comprise generating interpretations of the questions. The method may further comprise identifying and extracting relevant documents related to each of the interpretations of the questions, from repositories. Artificial Intelligence (AI) may be used to identify the relevant documents. The method may further comprise implementing a cognitive master to organize meetings between control testers for discussing over effectiveness of design and implementation test of test plans to mitigate the risks.

BRIEF DESCRIPTION OF DRAWINGS

The detailed description is described with reference to the accompanying figures. In the figures, the left-most digit(s) of a reference number identifies the figure in which the reference number first appears. The same numbers are used throughout the drawings to refer like features and components.

DETAILED DESCRIPTION

Some embodiments of the present disclosure, illustrating all its features, will now be discussed in detail. The words "extracting", "generating", "identifying", "implementing" and other forms thereof, are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a", "an" and "the" include plural references unless the context clearly dictates otherwise. Although any systems and methods similar or equivalent to those described herein can be used in the practice or testing of embodiments of the present disclosure, the exemplary, systems and methods for generating a score for a runbook or a scripture now described. The disclosed embodiments of the system and method to perform control testing to mitigate risks in an organization are merely exemplary of the disclosure, which may be embodied in various forms.

Various modifications to the embodiment will be readily apparent to those skilled in the art and the generic principles herein may be applied to other embodiments. However, one of ordinary skill in the art will readily recognize that the present disclosure to perform control testing to mitigate risks in an organization is not intended to be limited to the embodiments illustrated, but is to be accorded the widest scope consistent with the principles and features described herein.

Figure 1:
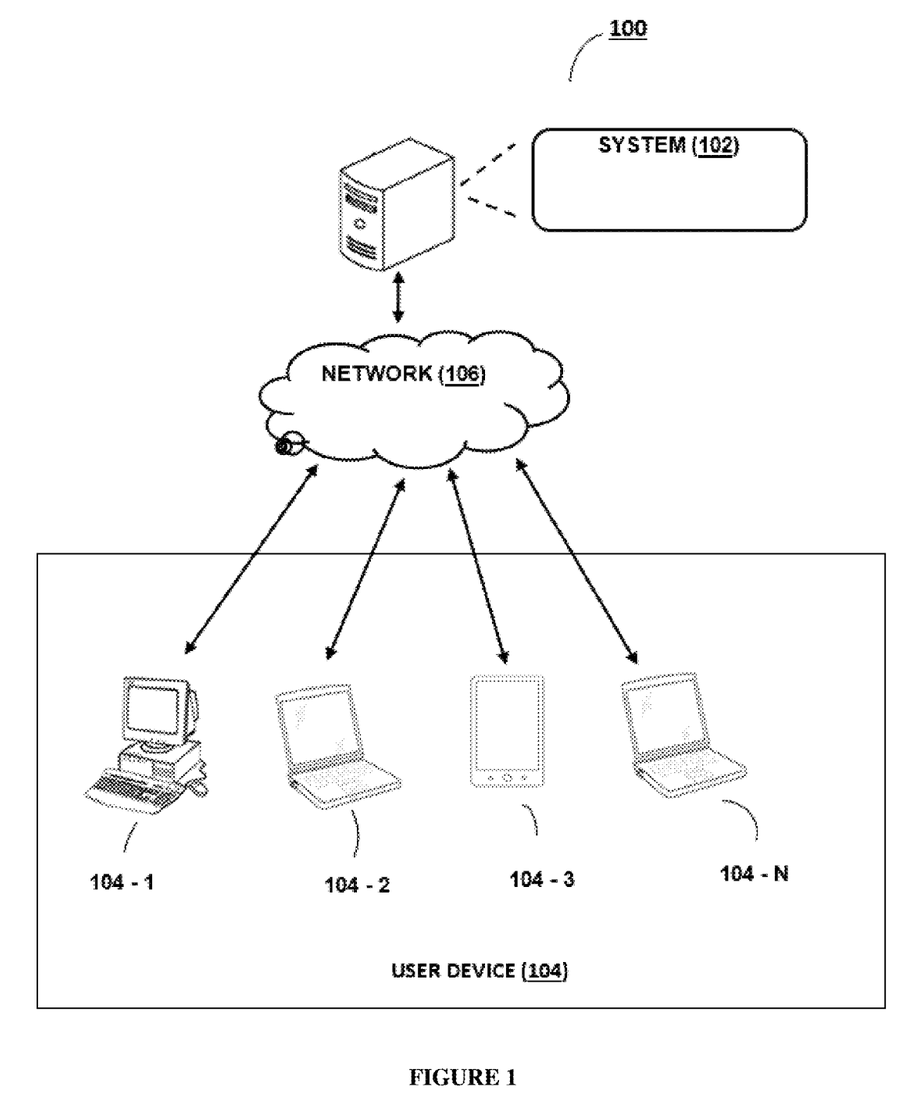
FIG. 1 illustrates a network implementation 100 of a system 102 performing control testing to mitigate risks in an organization, in accordance with an embodiment of the present subject matter.

Referring now to FIG. 1, a network implementation 100 of a system 102 for performing control testing to mitigate risks in an organization is disclosed. Although the present subject matter is explained considering that the system 102 is implemented on a server, it may be understood that the system 102 may also be implemented in a variety of computing systems, such as a laptop computer, a desktop computer, a notebook, a workstation, a mainframe computer, a server, a network server, and the like. In one implementation, the system 102 may be implemented over a cloud network. Further, it will be understood that the system 102 may be accessed by multiple users through one or more user devices 104-1, 104-2 . . . 104-N, collectively referred to as user device 104 hereinafter, or applications residing on the user device 104. Examples of the user device 104 may include, but are not limited to, a portable computer, a personal digital assistant, a handheld device, and a workstation. The user device 104 may be communicatively coupled to the system 102 through a network 106.

In one implementation, the network 106 may be a wireless network, a wired network or a combination thereof. The network 106 may be implemented as one of the different types of networks, such as intranet, local area network (LAN), wide area network (WAN), the internet, and the like. The network 106 may either be a dedicated network or a shared network. The shared network represents an association of the different types of networks that use a variety of protocols, for example, Hypertext Transfer Protocol (HTTP), Transmission Control Protocol/Internet Protocol (TCP/IP), Wireless Application Protocol (WAP), and the like, to communicate with one another. Further, the network 106 may include a variety of network devices, including routers, bridges, servers, computing devices, storage devices, and the like.

Figure 2:
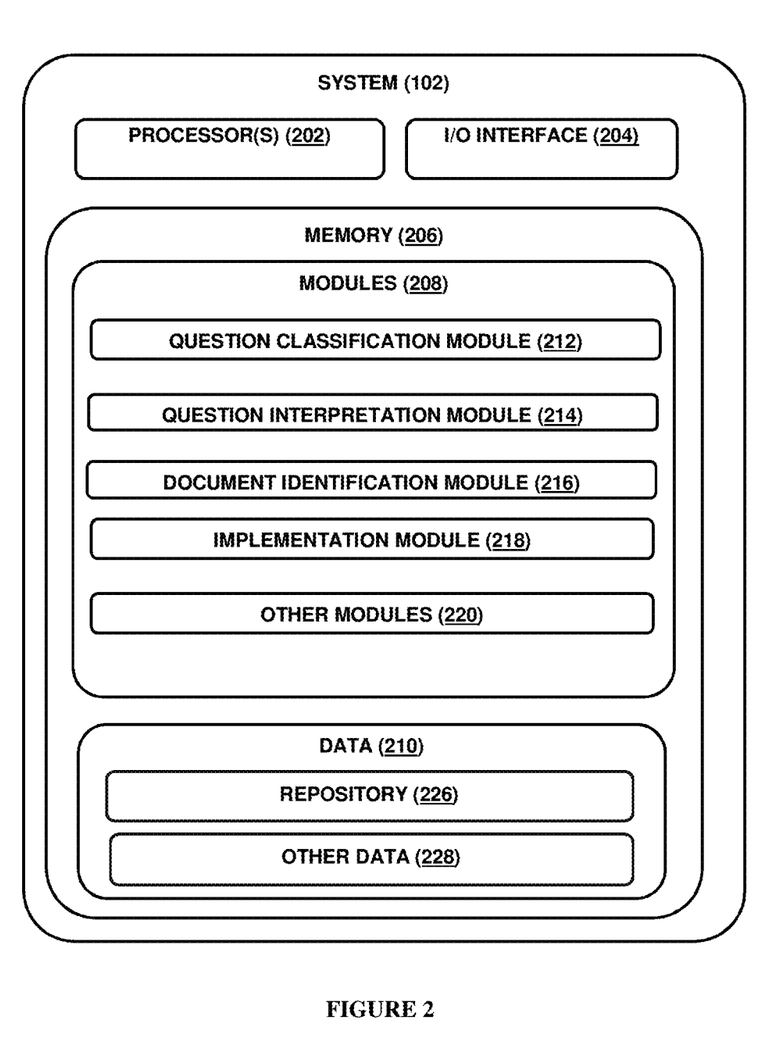
FIG. 2 illustrates a block diagram of the system 100 performing control testing to mitigate risks in an organization, in accordance with an embodiment of the present subject matter.

Referring now to FIG. 2, a block diagram of the system 102 performing control testing to mitigate risks in an organization is illustrated in accordance with an embodiment of the present subject matter. In one embodiment, the system 102 may include at least one processor 202, an input/output (I/O) interface 204, and a memory 206. The at least one processor 202 may be implemented as one or more microprocessors, microcomputers, microcontrollers, digital signal processors, central processing units, state machines, logic circuitries, and/or any devices that manipulate signals based on operational instructions. Among other capabilities, at least one processor 202 may be configured to fetch and execute computer-readable instructions stored in the memory 206.

The I/O interface 204 may include a variety of software and hardware interfaces, for example, a web interface, a graphical user interface, and the like. The I/O interface 204 may allow the system 102 to interact with the user directly or through the user device 104. Further, the I/O interface 204 may enable the system 102 to communicate with other computing devices, such as web servers and external data servers (not shown). The I/O interface 204 may facilitate multiple communications within a wide variety of networks and protocol types, including wired networks, for example, LAN, cable, etc., and wireless networks, such as WLAN, cellular, or satellite. The I/O interface 204 may include one or more ports for connecting a number of devices to one another or to another server.

The memory 206 may include any computer-readable medium known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes. The memory 206 may include modules 208 and data 210.

The modules 208 may include routines, programs, objects, components, data structures, and the like, which perform particular tasks, functions or implement particular abstract data types. In one implementation, the modules 208 may include a question classification module 212, a question interpretation module 214, a document identification module 216, an implementation module 218, and other modules 220. The other modules 220 may include programs or coded instructions that supplement applications and functions of the system 102.

The data 210, amongst other things, serve as a repository for storing data processed, received, and generated by one or more of the modules 208. The data 210 may also include a repository 226 and other data 228. In one embodiment, the other data 228 may include data generated as a result of the execution of one or more modules in the other modules 224.

In one implementation, for control testing to mitigate risks in an organization, at first, a pre-processing engine may pre-process and remove irrelevant content from control documents. After pre-processing, the control documents may be sent to the question classification module 212. The question classification module 212 may extract sentences from the control documents. The question classification module 212 may extract and classify the sentences as "questions" or "non-questions." The control documents generally have larger number of sentences that belong to "non-question" category than to "question" category. This is rare class question classification problem where one category has very few instances than other. To solve such rare class classification problem, several approaches including, but not limited to, boosting and bagging approaches may be used as per nature and quality of data.

In one embodiment, training data may also be generated for classification of the questions. Labelling each sentence from the control documents is tedious and time consuming; and requires availability of Subject Matter Experts (SMEs) which is also sometime not feasible. Therefore, the sentences may be classified based on active learning and pro-active learning. In one case, during the active learning and the pro-active learning, un-classified instances having very less probability of being classified by the question classification module 212 may be provided to the SMEs, through a user interface, for labelling. Afterwards, a classification model may be re-trained using SMEs inputs and inferences may be generated for leftover un-classified instances. Such process could be repeated until a sufficient number of labelled instances become available.

In one embodiment, deep neural networks may be implemented for classifying the sentences into the questions, and a deep auto-encoder or another similar architecture may be implemented for generating vector representation for the sentences. Here, a concept of transfer learning may be used where model parameters and hyper-parameters of deep auto-encoder architecture are used as input for further training over new dataset which is initially trained on a large corpus of documents for similar domain.

Upon extracting the questions from the control documents, multiple possible interpretations of the questions may be generated by the question interpretation module 214. The question interpretation module 214 may receive the questions as an input and may generate possible interpretations of the questions as an output. Such multiple interpretations may be generated using a relevant technique, such as Inverse Reinforcement Learning (IRL), reinforcement learning, Natural Language Generation (NLG), and attention based recurrent neural network.

In one embodiment, agents may be implemented to interact with environment to identify optimal policy which would lead to generation of multiple forms of the questions. In one case, the IRL technique may be used to identify an algorithm that can be used as reward function. The reward function may be used to generate an optimal policy from training data. Optimal policy could define a way in which various contextual information may be used for identification and generation of multiple forms of the questions. Training data will have actual questions along with possible interpretations of same questions. During training, reward for each form of the questions may be returned for evaluation by agent. In certain embodiments, contextual information such as risk type and policy may be incorporated to generate the interpretations of the questions.

Thereafter, relevant documents related to each of the interpretations of the questions may be identified and extracted by a document identification module. The relevant documents may be extracted from repositories. The document identification module 216 may use a relevant technique to identify and extract the relevant documents related to each of the interpretations of the questions. The relevant technique may be one of Natural Language Processing (NLP), Natural Language Generation (NLG), topic modelling, and document clustering. The relevant documents may be combined together to return a most relevant document. The document could be of any type or format such as pdf, xlsx, txt, doc, docx, any image files, or video etc.

In certain embodiments, Artificial Intelligence (AI) may be used to identify the relevant documents. An AI based system may use Natural Language Modelling (NLM), Natural Language Generation (NLG), and abstractive summarization to generate a summary of document which provides glimpse of what the most relevant document is talking about. Availability of the summary could reduce human efforts for looking into multiple documents to vet whether it is relevant or not.

In one embodiment, feedback may be provided either by a human or an agent using Reinforcement Learning where the document identification module 216 could train itself. The document identification module 216 could train itself in such a manner that relevant list of evidence documents or text can be provided as an answer to the questions. In some embodiment, the feedback may be used to train ranking model which will re-rank results returned previously.

In one embodiment, historical data could also be used to identify algorithms to find relevant evidences for the questions mentioned in the control document's test plan. The historical data may comprise previous control documents along with associated evidences. Further, the IRL technique may also be used to find a subset of algorithm to find relevant evidences for the questions.

In some embodiments, the document identification module 216 may use Reinforcement Learning where the agent will deduce approach on how to find relevant answers to questions for given set of algorithms selected using the IRL, technique. Here, answers to questions or list of multiple forms of questions may be generated, and answer against each of questions may be vetted by regularly providing reward and penalty for each of the questions. Such steps occur when the system 102 is exposed to a new environment never seen before.

In one embodiment, a cognitive master may be implemented by the implementation module 218 to organize meetings between control testers. The meetings may be organized via any of the known ways, such as on call, face to face meeting, or via any other medium. Meetings between the control testers and respective owners of process may be organized for discussing over effectiveness of design and implementation test of test plans to mitigate the risks. The cognitive master may be a conversation agent that enables conversation between testers while preserving context of conversation before reaching to a conclusion.

In some embodiments, a state of art voice recognition technique may be used for identifying identity of people. The voice recognition technique may also convert voice to text and vice-versa. The cognitive master may also leverage any of available conversation agent: from vendors like AWS, Microsoft, IBM etc. or can be self-developed using the NLP and Natural Language Understanding (NLU). The cognitive master may implement abstractive summarization method, and NLP and NLU based method to generate summary of conversation that occurs between control testers. Various Natural Language features such as dependency parser, and Noun Phrase and Verb Phrase extraction may also be implemented to generate sentences based on conversations between the control testers. Finally, the summary of conversation may define whether control design and implementation is effective for random set of samples or not.

For practical implementation, Know Your Customer (KYC) can be considered as a control which needs to be tested for each customer who is being on-boarded. Here, an organization may be a financial institution which is responsible for testing the control, and control testing results may be validated by audit companies. For the KYC process, following checks may need to be performed:
a) During a design test, check if a procedure exists for KYC process or not,
b) During a validation test, check if procedure is valid and compliant for KYC, and
c) During an implementation test, check if procedure is applicable for KYC processes for all customers to ensure all risks have been mitigated.

Exemplary embodiments discussed above may provide certain advantages. Though not required to practice aspects of the disclosure, these advantages may include those provided by the following features.

Some embodiments of the system and the method automates the process of control testing to mitigate risks in an organization.

Some embodiments of the system and the method is configured to use active and pro-active learning for classifying the sentences as questions or non-questions.

Some embodiments of the system and the method is configured to use Inverse Reinforcement Learning for identification of set of algorithms to generate multiple interpretation of a question.

Figure 3:
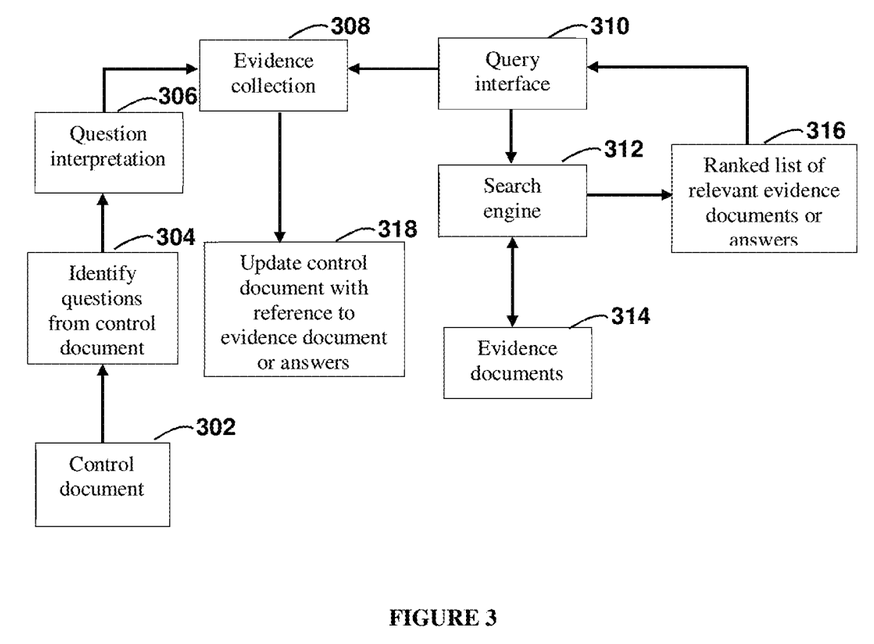
FIG. 3 illustrates a method to perform control testing to mitigate risks in an organization, in accordance with an embodiment of the present subject matter.

Referring now to FIG. 3, a method 300 to perform control testing to mitigate risks in an organization, is disclosed in accordance with an embodiment of the present subject matter. The method 300 may be described in the general context of computer executable instructions. Generally, computer executable instructions can include routines, programs, objects, components, data structures, procedures, modules, functions, and the like, that perform particular functions or implement particular abstract data types. The method 300 may also be practiced in a distributed computing environment where functions are performed by remote processing devices that are linked through a communications network. In a distributed computing environment, computer executable instructions may be located in both local and remote computer storage media, including memory storage devices.

The order in which the method 300 is described is not intended to be construed as a limitation, and any number of the described method blocks can be combined in any order to implement the method 300 or alternate methods. Additionally, individual blocks may be deleted from the method 300 without departing from the spirit and scope of the subject matter described herein. Furthermore, the method 300 can be implemented in any suitable hardware, software, firmware, or combination thereof. However, for ease of explanation, in the embodiments described below, the method 300 may be considered to be implemented in the above described system 102.

At block 302, a control document may be provided to the system 102. The system 102 may identify questions from the control document, at block 304. At block 306, such questions may be interpreted. For the interpretations of the questions, corresponding evidence may be collected at block 308. For obtaining the evidence, a user may run a query at a query interface, at block 310. The query may be run via a search engine, at block 312. The search engine may collect the corresponding evidence from a knowledge database storing evidence documents, at block 314. Retrieved evidence documents or answers may be ranked at block 316. Such ranked list may be provided to the query interface at the block 310. Finally, control documents may be updated with reference to retrieved evidence documents or answers, at block 318.

Figure 4:
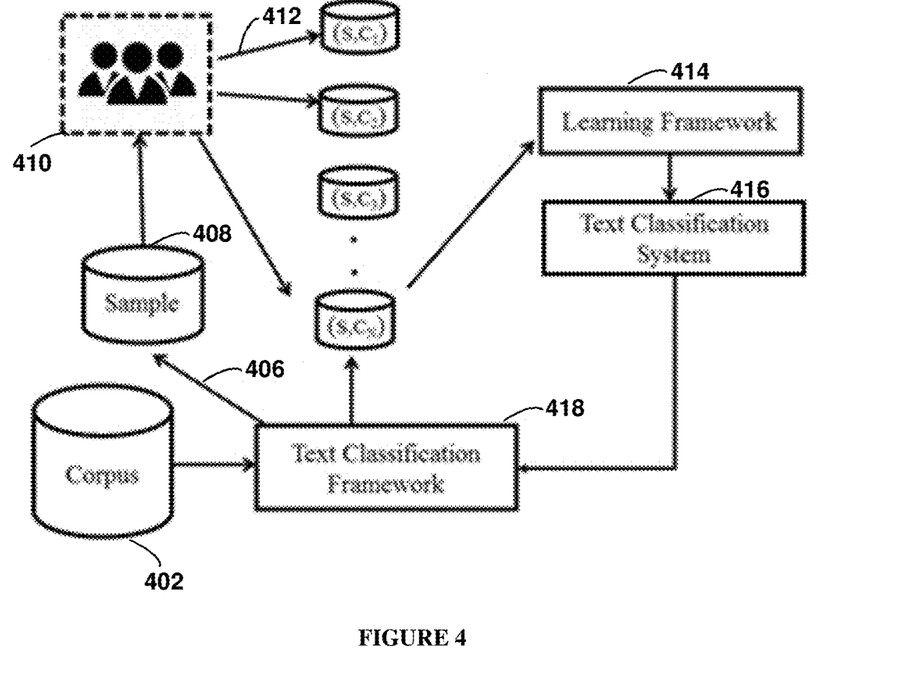
FIG. 4 illustrates a pro-active learning technique for question classification, in accordance with an embodiment of the present subject matter.

Referring now to FIG. 4, a pro-active learning technique for question classification, is illustrated in accordance with an embodiment of the present subject matter. In one embodiment, sentences stored in a corpus 402 may be provided to a text classification framework 404. The text classification framework 404 may select sentences at step 406 and store them as sample, at block 408. The sentences stored as sample may be provided to users for labelling, at block 410. In one case, un-classified instances having very less probability of being classified by the system may be provided to the users for labelling. The users may select classes for the sentences, at step 412. These sentences and their labels may be provided to a learning framework, at block 414. The learning framework may assist a text classification system, at block 416. A text classification framework may be continuously updated until a sufficient number of labelled instances become available, at block 418.

Figure 5:
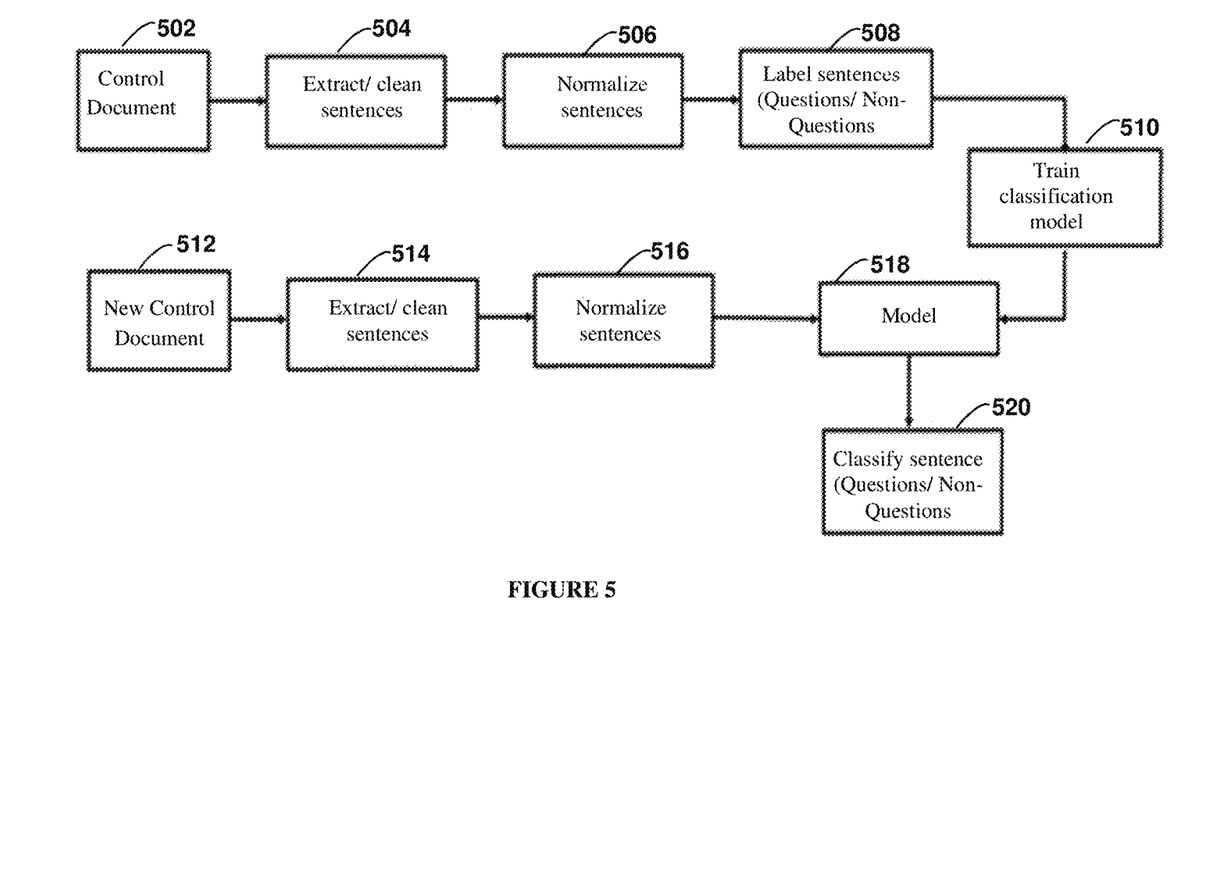
FIG. 5 illustrates a method for classification of questions, in accordance with an embodiment of the present subject matter.

Referring now to FIG. 5, a method for classification of questions, is illustrated in accordance with an embodiment of the present subject matter. In one embodiment, the method may be considered to be implemented on the above described system 102.

At block 502, a control document may be provided to the system 102. At block 504, sentences may be extracted from the control document. At block 506, the sentences may be normalized to remove garbage or to remove undesired sentences. At block 508, the sentences may be labelled by a Subject Matter Expert (SME). The sentences may be labelled as questions or non-questions. Such sentences and their labels may constitute to training data. At block 510, such sentences and their labels provided by the SME may be used to train a classification model.

Subsequent to training of classification model, a new control document may be received, at block 512. At block 514, sentences may be extracted from the new control document. At block 516, the sentences may be normalized to remove garbage or to remove undesired sentences. At block 518, normalized sentences i.e. inferences may be provided to a classification model trained or developed previously. At block 520, the classification model may classify the normalized sentences into questions or non-questions.

Figure 6:
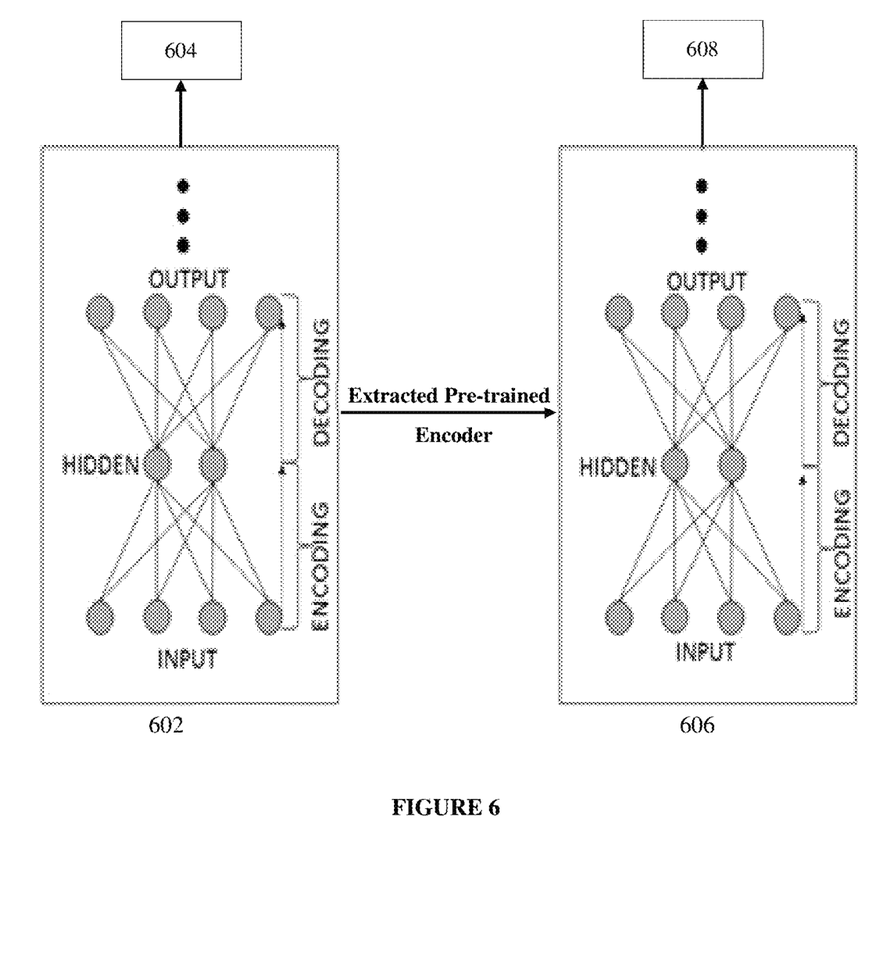
FIG. 6 illustrates transfer of learning for question classification, in accordance with an embodiment of the present subject matter.

Referring now to FIG. 6, transfer of learning for question classification, is illustrated in accordance with an embodiment of the present subject matter. In one embodiment, the system 102 may use a transfer learning technique to use knowledge from a pre-trained model 602 that is built over a period of time, and is used as an old classifier 604. The knowledge may correspond to model parameters and hyper-parameters of deep auto-encoder architecture used as input for further training over new model 606. The new model 606 may thereupon be used as a new classifier 608.

Figure 7:
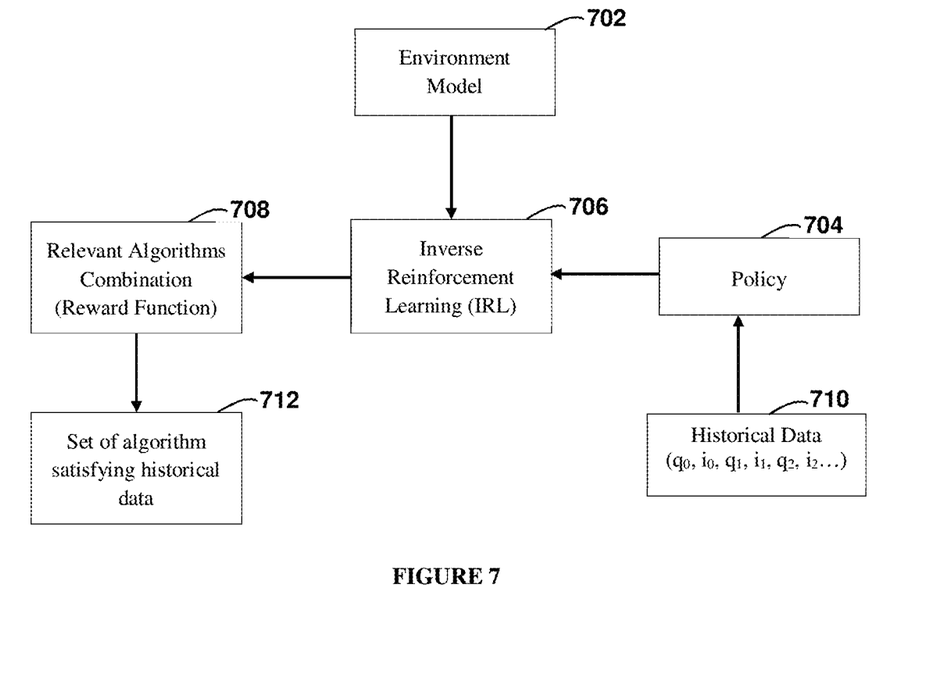
FIG. 7 illustrates a method of using Inverse Reinforcement Learning (IRL) technique for interpreting the questions, in accordance with an embodiment of the present subject matter.

Referring now to FIG. 7, a method of using Inverse Reinforcement Learning (IRL) technique for interpreting the questions, is illustrated in accordance with an embodiment of the present subject matter. The system 102 may utilize agents to interact with an environment model, at block 702.

The agent may interact with the environment model to identify an optimal policy, at block 704, which would lead to generation of multiple forms of the questions. In one case, the IRL technique may be used, at block 706, to identify algorithms that can be used as a reward function. In one case, multiple relevant algorithms may be combined to obtain the reward function, at block 708. The reward function may be used to generate an optimal policy from training data. Optimal policy could define a way in which various contextual information may be used for identification and generation of multiple forms of the questions.4

At block 710, historical data could also be used to identify algorithms to find relevant evidences for the questions mentioned in the control document's test plan. The historical data may comprise previous control documents along with associated evidences. Further, the IRL technique may also be used to find a subset of algorithm to find relevant evidences for the questions. Finally, a set of algorithm satisfying the historical data may be obtained, at block 712.

Figure 8:
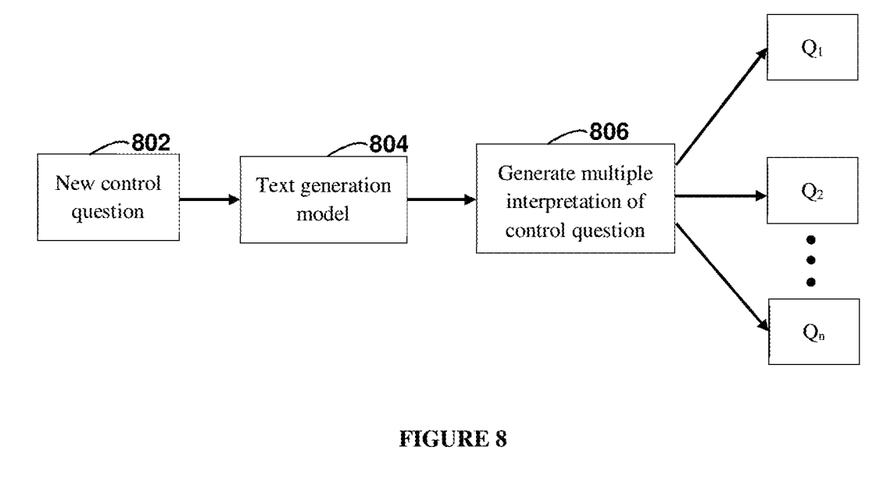
FIG. 8 illustrates a method of generating multiple interpretations of the questions, in accordance with an embodiment of the present subject matter.

Referring now to FIG. 8, a method of generating multiple interpretations of the questions, is illustrated in accordance with an embodiment of the present subject matter. At block 802, a new control question may be obtained. A new control question may indicate a question recently classified from a new control document. The new control question may be provided to a text generation model, at block 804. Thereupon, multiple interpretations of the new control question may be generated, at block 806. The multiple interpretations of the new control question are illustrated as $Q_1, Q_2, \ldots Q_n$.

Although implementations for systems and methods to perform control testing to mitigate risks in an organization have been described, it is to be understood that the appended claims are not necessarily limited to the specific features or methods described. Rather, the specific features and methods are disclosed as examples of implementations for control testing to mitigate risks in an organization.

The invention claimed is:

1. A method to perform control testing to mitigate risks in an organization, the method comprising:
  applying, by a processor, at least one of an active learning technique and pro-active learning technique for classifying sentences into one of questions and non-questions using a text classification model, wherein the sentences are extracted from control documents, wherein, during the active learning and the pro-active learning, un-classified instances having a low probability of being classified by the question classification module are iteratively provided to a Subject Matter Expert (SME) for labelling via a graphical user interface (GUI) of a user device, and wherein the text classification model is iteratively re-trained for classifying the un-classified instances into one of the questions and the non-questions based on the labelling;
  generating, by the processor, a vector representation of the sentences classified as the questions;
  processing, by the processor, the vector representation of the sentences classified as the questions for generating one or more interpretations of the questions by using at least one of an Inverse Reinforcement Learning (IRL), a reinforcement learning, a Natural Language Generation (NLG), and an attention based recurrent neural network;
  identifying, by the processor, relevant documents related to each of the interpretations of the questions, from repositories, using at least one of a Natural Language Processing (NLP), the NLG, a topic modelling, and a document clustering wherein a summary is generated corresponding to the relevant document using at least one of the NLG, a Natural Language Modelling (NLM), and an abstractive summarization method, and wherein the identifying comprises:
    enabling a self-training process through a feedback provided by using Reinforcement Learning in response to a user's query via the GUI of the user device search engine to retrieve and generate a relevant list of evidence documents for each of the interpretations of the questions from a knowledge database;
    applying a ranking model for ranking results in the relevant list, wherein the feedback is used to train the ranking model for re-ranking the results returned previously; and
    updating, via the GUI of the user device, control documents with associated evidences to identify algorithms to be used to find relevant evidences for the questions mentioned in a test plan of the control document; and
  enabling, through a cognitive master, communication between control testers and process owners, wherein the communication is enabled for discussing over effectiveness of design and implementation test of test plans based on an evaluation of the relevant documents and corresponding summaries, thereby mitigating the risks,
  wherein the cognitive master is self-developed using at least one of the NLP and Natural Language Understanding (NLU),
  wherein the cognitive master is configured to implement at least one of the abstractive summarization method, the NLP, and the NLU based method to generate a summary of the communication between the control testers, and
  wherein Natural Language features comprising at least one of dependency parser, Noun Phrase, and Verb Phrase extraction are implemented to generate sentences based on communication between the control testers.

2. The method as claimed in claim 1, further comprising implementing deep neural networks for the text classification model for classifying the sentences into the questions, and implementing a deep auto-encoder network for generating vector representation for the sentences.

3. The method as claimed in claim 2, further comprising utilizing transfer learning with the deep auto-encoder network for generating the vector representation of the sentences.

4. The method as claimed in claim 1, wherein the IRL technique is used to identify an algorithm that can be used as reward function, and wherein the reward function is used to determine an optimal policy to generate the interpretations of the questions.

5. The method as claimed in claim 1, further comprising utilizing historical data comprising previous control documents along with associated evidences.

6. The method as claimed in claim 1, wherein Know Your Customer (KYC) process is a control to be tested for each customer being on-boarded in an organization, wherein the organization is a financial institution responsible for testing the control and control testing results are validated by audit companies.

7. A system performing control testing to mitigate risks in an organization, the system comprising:
  a memory;

a processor coupled to the memory, wherein the processor is configured to execute programmed instructions stored in the memory to:

apply at least one of an active learning technique and pro-active learning technique for classifying sentences into one of questions and non- questions using a text classification model, wherein the sentences are extracted from control documents, wherein, during the active learning and the pro-active learning, un-classified instances having a low probability of being classified by the question classification module are iteratively provided to a Subject Matter Expert (SME) for labelling via a graphical user interface (GUI) of a user device, and wherein the text classification model is iteratively re-trained for classifying the un-classified instances into one of the questions and the non-questions based on the labelling;

generate a vector representation of the sentences classified as the questions;

process the vector representation of the sentences classified as the questions for generating one or more interpretations of the questions by using at least one of an Inverse Reinforcement Learning (IRL), a reinforcement learning, a Natural Language Generation (NLG), and an attention based recurrent neural network;

identify-relevant documents related to each of the interpretations of the questions, from repositories, using at least one of a Natural Language Processing (NLP), the NLG, a topic modelling, and a document clustering, wherein a summary is generated corresponding to the relevant document using at least one of the NLG, a Natural Language Modelling (NLM), and an abstractive summarization method, and wherein the identifying comprises:

enabling a self-training process through a feedback provided by using Reinforcement Learning in response to a user's query via the GUI of the user device search engine to retrieve and generate a relevant list of evidence documents for each of the interpretations of the questions from a knowledge database;

applying a ranking model for ranking results in the relevant list, wherein the feedback is used to train the ranking model for re-ranking the results returned previously; and updating, via the GUI of the user device, control documents with associated evidences to identify algorithms to be used to find relevant evidences for the questions mentioned in a test plan of the control document; and enable, through a cognitive master, communication between control testers and process owners, wherein the communication is enabled for discussing over effectiveness of design and implementation test of test plans based on an evaluation of the relevant documents and corresponding summaries, thereby mitigating the risks, wherein the cognitive master is self-developed using at least one of the NLP and Natural Language Understanding (NLU), wherein the cognitive master is configured to implement at least one of the abstractive summarization method, the NLP, and the NLU based method to generate a summary of the communication between the control testers, and wherein Natural Language features comprising at least one of dependency parser, Noun Phrase, and Verb Phrase extraction are implemented to generate sentences based on communication between the control testers.

8. The system as claimed in claim 7, further comprising implementing deep neural networks for the text classification model for classifying the sentences into the questions and implementing a deep auto-encoder network for generating vector representation for the sentences.

9. The system as claimed in claim 8, further comprising utilizing transfer learning with the deep auto-encoder network for generating the vector representation of the sentences.

10. The system as claimed in claim 7, wherein the IRL technique is used to identify an algorithm that can be used as reward function, and wherein the reward function is used to determine an optimal policy to generate the interpretations of the questions.

11. The system as claimed in claim 7, further comprising utilizing historical data comprising previous control documents along with associated evidences.

12. The system as claimed in claim 7, wherein Know Your Customer (KYC) process is a control to be tested for each customer being on-boarded in an organization, wherein the organization is a financial institution responsible for testing the control and control testing results are validated by audit companies.

* * * * *